April 15, 1941.  J. CAPUCIATI  2,238,410
VEHICLE WHEEL
Filed Aug. 26, 1938   2 Sheets-Sheet 1

Inventor
Joseph Capuciati

By Clarence A. O'Brien
and Hyman Berman
Attorneys

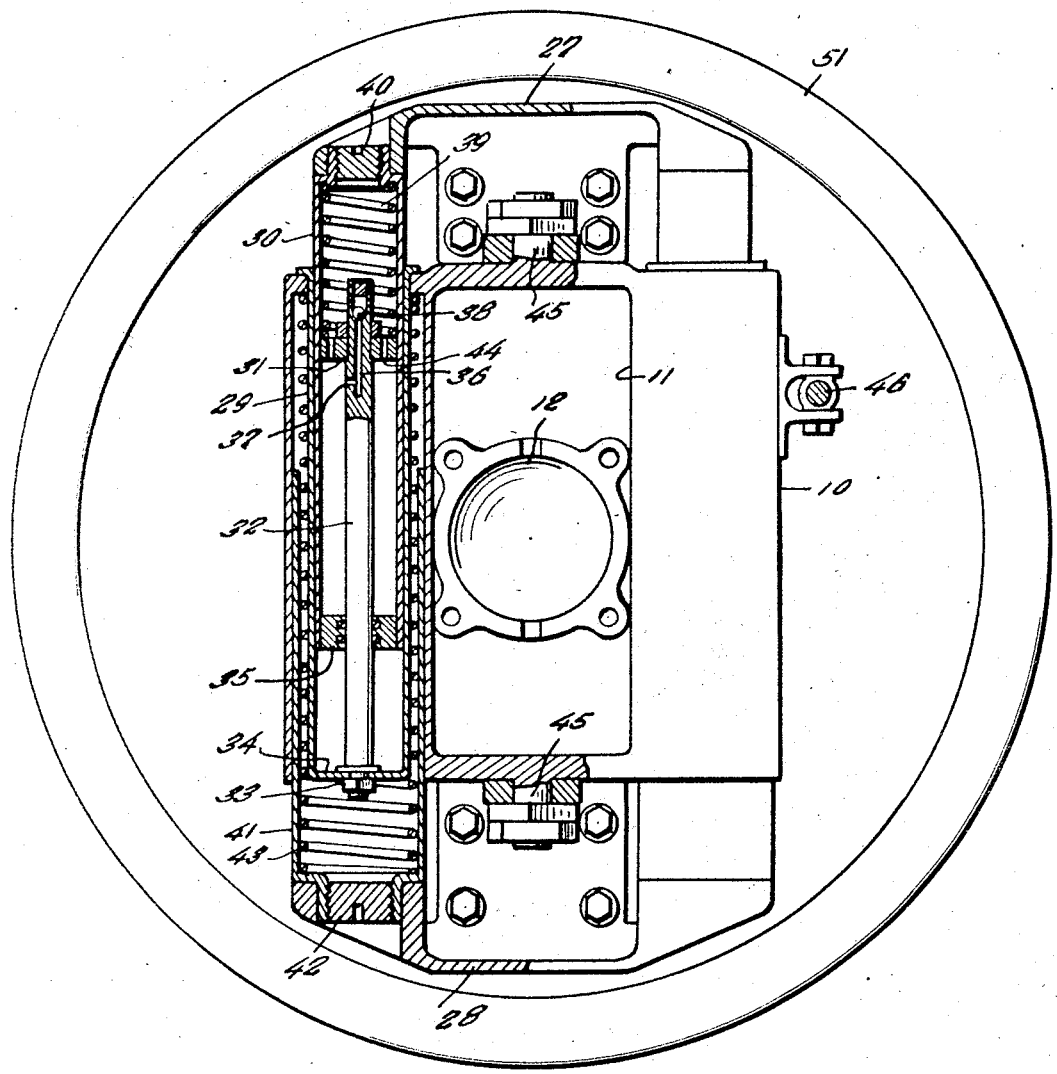

Patented Apr. 15, 1941

2,238,410

UNITED STATES PATENT OFFICE 2,238,410

VEHICLE WHEEL

Joseph Capuciati, New York, N. Y.

Application August 26, 1938, Serial No. 227,011

2 Claims. (Cl. 280—96.2)

This invention appertains to new and useful improvements in vehicle wheels and more particularly to a wheel assembly in the category of wheel structures of the present day "knee action type."

The principal object of the present invention is to provide an improved wheel structure which distinguishes itself from the conventional "knee action type" wheel by the qualification of being self-contained.

Another important object of the invention is to provide a wheel structure wherein the wheel proper is suspended by spring means to take care of unevenness of terrain and to absorb shocks in a much more efficient and satisfactory manner than through the agency of such means as are now generally and conventionally employed and known as "knee action devices."

These and other important objects and advantages of the invention will become apparent to the reader of the following specification.

In the drawings—

Figure 2 is a fragmentary detailed sectional view.

Figure 3 is a cross sectional view through the upper portion of the stem.

Figure 1:
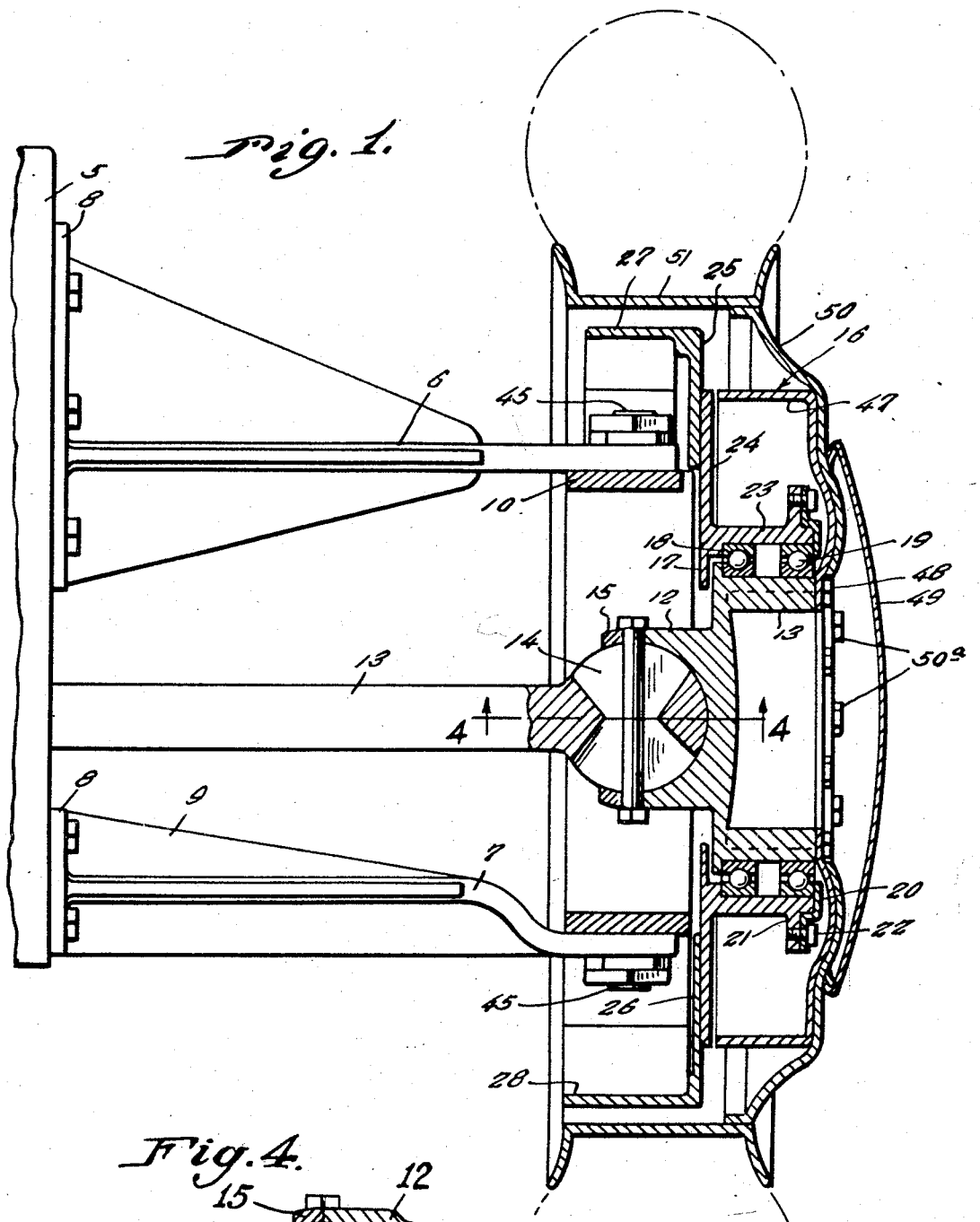
Figure 1 represents a vertical sectional view through the improved wheel.
Figure 4:
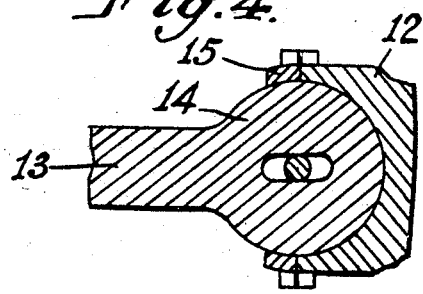
Figure 4 is a fragmentary sectional view taken on the line 4—4 of Figure 1.

Referring to the drawings wherein like numerals designate like parts, it can be seen in the drawings, that numeral 5 represents the usual chassis frame from which extends the pair of arms 6 and 7, vertically spaced. These arms are attached to the chassis frame by a plate 8 and outwardly tapering web 9 extends from the plate 8 to brace and reinforce the arms 6 and 7.

Numeral 10 denotes a frame-like structure, into the vertically extending elongated opening 11 of which extends the extension 12 of the hub 13. The axle shaft 13 has a pin and slot drive connection 14 and 15 in conjunction with the extension 12.

A sectional annulus 16 circumscribing the hub 13 is provided with the internal circumferentially extending flange 17 which interlaps the rear side of the hub 13. Interposed between the hollow annulus 16 and the hub 13 are the ball bearing assemblies 18 and 19. A removable flanged ring 20 is secured to the outstanding flange 21 of the hollow annulus 16 by screws 22 and this flanged ring 20 overlaps the outermost ball bearing assembly 19 as in the manner substantially shown in Figure 1.

This hollow assembly 16 consists of the band 23 between which and the hub 13, the ball bearing assemblies are located and from which extends the back wall 24 attached to the vertical plate 25 at one upper portion and the plate 26 at another portion. These plates 25 and 26 are provided with horizontally disposed bridge portions 27 and 28, respectively thereof.

The aforementioned frame 10 has its vertical side portions of hollow construction and each side portion has the downwardly extending sleeve 29 therein which slidably receives the corresponding barrel 30 and inside of this barrel 30 is the plunger 31 carried by the stem 32, this stem 32 being anchored at its lower end as at 33 to the closed bottom 34 of the said sleeve 29. The lower end of the barrel 30 has a closure plug 35 fixed therein with an opening therethrough packed to slidably receive the said stem 32.

The upper portion of the stem 32 has a bore 36 opening through the side of the stem 32 and as at 37 below the plunger 31 while its upper end opens into the barrel 30 above the plunger 31 and therein is provided the ball check valve 38.

A coiled compression spring 39 is provided in the upper portion of the barrel 30 between the plunger 31 and the upper end of the barrel and this is provided with a filler plug 40 permitting replenishment of liquid, such as anti-freeze liquid in the barrel 30.

A tube 41 is slidably disposed into the hollow side member of each frame to circumscribe the lower portion of the corresponding sleeve 29. As can be seen in Figure 2, the lower portion of the tube 41 has the oil filler plugs 42 and each of these tubes 41 is supported by the lower bridge structure 28, while the upper bridge structure 27 carries the barrels 30.

A coiled compression spring 43 is interposed between the bottom of the tube 41 and the top of the particular side portion of the frame 10 as in the manner substantially shown in Figure 2.

It can also be seen in the drawings that the plunger 31 has by-pass openings 44 therein. These by-pass openings and the plunger in conjunction with the spring 39 and associated spring 43 of course take care of snubbing the resilient action of the wheel besides offering a compensatory action of the wheel when the vehicle is traveling over an uneven terrain.

As can be seen in Figures 1 and 2, the upper and lower ends of the frame 10 are provided with pintles 45 which extend through the corresponding arms 6 and 7, thus swingably connecting the wheel assembly aforedescribed to the arms 6 and 7.

Numeral 46 denotes a tie rod connection between frame 10 of complementary wheel.

As is apparent in Figure 1, the annulus 16 is made up of sections consisting of the back wall 24 and ring 23 in complement with section 47 which has an inwardly disposed flange bolted as at 48 to the hub 13. With this construction, the section 47 of the annulus 16 rotates independently of the back plate section 24. Numeral 49 represents a hub cap, while numeral 50 represents the wheel disk or center which is suitably secured as by bolting to the hub 13 as at 50ª and rotates with the hub 13. Numeral 51 represents the usual tire rim.

While the foregoing specification sets forth the invention in specific terms, it is to be understood that numerous changes in the shape, size and material may be resorted to without departing from the spirit and scope of the invention as claimed hereinafter.

Having described the invention, what is claimed as new is:

1. In combination with a vehicle chassis, a wheel having a hub, a pair of vertically spaced arms projecting rigidly from the chassis, a vertically disposed frame having its upper and lower ends pivoted to the outer ends of the arms, cylinders carried by the side portions of the frame, a back wall section carried by the wheel, said hub being rotatable with respect to the back wall section, plunger members carried by the back wall section and extending into the cylinders, and compression springs in the cylinders against which the members on the back wall section are operative, said plunger members extending downwardly and upwardly into the cylinders from the upper and lower portions of the back wall section and being in telescopic relation to each other.

2. In combination with a vehicle chassis, a wheel having a hub, a pair of vertically spaced arms projecting rigidly from the chassis, a vertically disposed frame having its upper and lower ends pivoted to the outer ends of the arms, cylinders carried by the side portions of the frame, a back wall section carried by the wheel, said hub being rotatable with respect to the back wall section, plunger members carried by the back wall section and extending into the cylinders, and compression springs in the cylinders against which the members on the back wall section are operative, said back wall section provided with an annulus overlapping the hub and bearing means between the annulus and the hub.

JOSEPH CAPUCIATI.